United States Patent
Takeshita et al.

(10) Patent No.: US 8,053,129 B2
(45) Date of Patent: Nov. 8, 2011

(54) FUEL CELL SYSTEM, FUEL CELL VALVE SYSTEM, AND FUEL CELL GAS SUPPLY DEVICE

(75) Inventors: Masahiro Takeshita, Susono (JP); Tsukio Ishitoya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 813 days.

(21) Appl. No.: 12/085,510

(22) PCT Filed: Nov. 9, 2006

(86) PCT No.: PCT/JP2006/322791
§ 371 (c)(1),
(2), (4) Date: May 23, 2008

(87) PCT Pub. No.: WO2007/063709
PCT Pub. Date: Jun. 7, 2007

(65) Prior Publication Data
US 2009/0169963 A1    Jul. 2, 2009

(30) Foreign Application Priority Data
Nov. 29, 2005   (JP) .................................. 2005-344687

(51) Int. Cl.
*H01M 8/02* (2006.01)
*H01M 8/04* (2006.01)
(52) U.S. Cl. .................... 429/443; 429/455; 429/512
(58) Field of Classification Search .................. 429/415, 429/429, 437, 455, 512; 137/613
See application file for complete search history.

(56) References Cited

U.S. PATENT DOCUMENTS

| | | |
|---|---|---|
| 2004/0099048 A1 | 5/2004 | Miura et al. |
| 2004/0261866 A1 | 12/2004 | Suzuki et al. |
| 2005/0056338 A1 | 3/2005 | Hertzler et al. |
| 2006/0166060 A1 | 7/2006 | Miura |

FOREIGN PATENT DOCUMENTS

| | | |
|---|---|---|
| JP | 60-52480 | 4/1985 |
| JP | 60-501467 A | 9/1985 |
| JP | 8-021539 A | 1/1996 |
| JP | 8-329965 | 12/1996 |
| JP | 11-154528 A | 6/1999 |
| JP | 2004-170321 A | 6/2004 |

(Continued)

OTHER PUBLICATIONS

IPDL Machine Translation of JP 2005-282697A (Oct. 2005).*

*Primary Examiner* — Gregg Cantelmo
(74) *Attorney, Agent, or Firm* — Kenyon & Kenyon LLP

(57) ABSTRACT

A fuel cell system includes a first shut valve capable of shutting off a gas flow in a gas path where a fuel cell gas flows; and a second shut valve arranged more towards the downstream side of the gas flow than the first shut valve, and capable of shutting off the gas flow. In each of the first shut valve and the second shut valve, sealing is performed by intimate contact between a movable member and a seal member and a gas pressure supplied from the upstream applies a force to the movable member to bring it into intimate contact with the seal member. A deformation degree by an external force of the same intensity is set greater in the seal member of the second shut valve than in the seal member of the first shut valve.

10 Claims, 7 Drawing Sheets

FOREIGN PATENT DOCUMENTS

| | | |
|---|---|---|
| JP | 2005-011703 A | 1/2005 |
| JP | 2005-023975 A | 1/2005 |
| JP | 2005-090747 A | 4/2005 |
| JP | 2005/201822 A | 7/2005 |
| JP | 2005-216519 A | 8/2005 |
| JP | 2005-235593 A | 9/2005 |
| JP | 2005-282697 A | 10/2005 |
| JP | 2006-147346 A | 6/2006 |

* cited by examiner

FUEL CELL SYSTEM, FUEL CELL VALVE SYSTEM, AND FUEL CELL GAS SUPPLY DEVICE

This is a 371 national phase application of PCT/JP2006/322791 filed 9 Nov. 2006, claiming priority to Japanese Patent Application No. 2005-344687 filed 29 Nov. 2005, the contents of which are incorporated herein by reference.

TECHNICAL FIELD

The present invention relates to a fuel cell system provided with shut valves capable of shutting off a gas flow, a fuel cell valve system, and a fuel cell gas supply device.

BACKGROUND ART

A related art of this type of fuel cell system is disclosed in JP 2005-201822 A. In JP 2005-201822 A, two openable/closable shut valves are provided in a fuel gas supply path for connecting a fuel tank and the anode side of a fuel cell, and a regulating valve is provided between the two shut valves. When generating electricity from the fuel cell, the two shut valves are opened to let the fuel gas flow from the fuel tank to the fuel cell. The pressure of the fuel gas is regulated by the regulating valve before being supplied to the fuel cell. On the other hand, when stopping the generation of electricity from the fuel cell, the two shut valves are closed to stop supply of the fuel gas to the fuel cell. Accordingly, sealability of fuel gas when stopping generation of electricity from the fuel cell is improved.

A fuel cell system is also disclosed in JP 2005-11703 A, JP 2004-170321 A, and JP 8-329965 A.

In JP 2005-201822 A, two shut valves are provided in the fuel gas supply path for connecting the fuel tank with the anode side of the fuel cell so as to improve sealability. In this case, performance required of each shut valve depends on where each shut valve is disposed. For example, a shut valve disposed on an upstream side (fuel tank side) of the fuel gas flow is required to ensure sealability against high pressure of fuel gas. On the other hand, a shut valve disposed on the downstream side (fuel cell side) of the fuel gas flow is required to ensure sealability against low pressure of fuel gas. Conventionally, common shut valves having the sealability required in all locations of disposal are arranged in series. However, as a result of higher pressure of supplied fuel gas (higher pressure of fuel gas storage means), the pressure range and temperature range, etc. required of shut valves became broader. Consequently, it became necessary to use rare materials as materials for the shut valve seal member, and the size of components became larger due to the provision of redundancy, which resulted in a complicated shut valve configuration.

The present invention provides a fuel cell system, a fuel cell valve system, and fuel gas supply device, using a simpler shut valve without deteriorating the sealability of the entire system.

DISCLOSURE OF THE INVENTION

In summary, the fuel cell system according to the present invention includes a fuel cell, a first shut valve capable of shutting off a gas flow in a gas path where a fuel cell gas flows, and a second shut valve arranged more towards the downstream side of the gas flow than the first shut valve and capable of shutting off the gas flow, and having characteristics different from those of the first shut valve.

The shut valve characteristics may be represented, for example, as a sealability characteristic against gas pressure supplied from the upstream side of the gas flow. When sealing the shut valve by a seal member, the characteristics of shut valve may be represented, for example, as a deformation characteristic of the seal member against the gas pressure supplied from the upstream side of the gas flow. According to the present invention, characteristics of each shut valve are varied according to where each shut valve is disposed so as to match the performance of each shut valve to that required at each disposition location. Consequently, the configuration of the shut valve may be simplified without deteriorating the sealability of the overall system.

In the present invention, the first shut valve is capable of shutting off the gas flow by intimate contact between a first intimate contact portion provided at the first shut valve and a first seal member, and the second shut valve may be made such that it is capable of shutting off the gas flow by intimate contact between a second intimate contact portion provided at the second shut valve and a second seal member having physical properties different from those of the first seal member. For example, the elastic characteristics (modulus of elasticity) of the first seal member and the second seal member may be made different, and the modulus of elasticity of the second seal member may be set smaller than that of the first seal member. Also, the hardness of the first seal member and the second seal member may be made different, and the first seal member may be made harder than the second seal member.

In the present invention, the first seal member and the second member may be made such that they possess different characteristics in terms of degree of deformation by an external force of the same intensity. It is preferable that the second seal member is easily deformable by an external force of the same intensity than the first seal member, that is, the degree of deformation of the second seal member by an external force of the same intensity is greater than that of the first seal member.

In the present invention, the first seal member and the second seal member may be made of different materials. The first seal member may be made of a hard material whereas the second seal member may be made of a soft material. For example, it is preferable that the first seal member is made of resin and the second seal member is made of rubber.

In the present invention, cross sectional shapes of the first seal member and the second seal member may be made different from each other. It is preferable that the cross sectional shape of the first seal member is a solid shape and the cross sectional shape of the second seal member is a hollow shape.

In the present invention, the second seal member may possess a predetermined gas permeation characteristic. The gas permeation characteristic of the second seal member may be set to a desired gas permeation characteristic by setting of the material for the second seal member. Butyl rubber, for example, may be used as a material for the second seal member as a material having a gas permeation characteristic. Alternatively, silicone rubber may be used as a material for the second seal member as a material having a gas permeation characteristic.

In the present invention, a pressure-reducing device for reducing pressure of the supplied gas and outputting the pressure-reduced gas is provided between the first shut valve and the second shut valve in the gas path. Further, at least one of the first shut valve and the second shut valve may be such that a force in the direction of shutting off the gas flow acts thereon by a pressure of gas supplied from the upstream side of the gas flow.

The present invention may also be understood as an invention relating to a fuel cell valve system or as an invention relating to a fuel gas supply device, in addition to being an invention relating to a fuel cell system. The fuel cell valve system according to the present invention in summary comprises a first shut valve capable of shutting off a gas flow in a gas path where a fuel cell gas flows, and a second shut valve arranged more to the downstream side of the gas flow than the first shut valve and capable of shutting off the gas flow, and having characteristics different from those of the first shut valve.

The fuel gas supply device according to the present invention, in summary, is a device capable of supplying a fuel gas from a fuel gas supply source via a gas path, comprising a first shut valve capable of shutting off a fuel gas flow in the gas path, a second shut valve arranged more to the downstream side of the fuel gas flow than the first shut valve and capable of shutting off the fuel gas flow, and having characteristics different from those of the first shut valve.

BEST MODE FOR CARRYING OUT THE INVENTION

Figure 1:
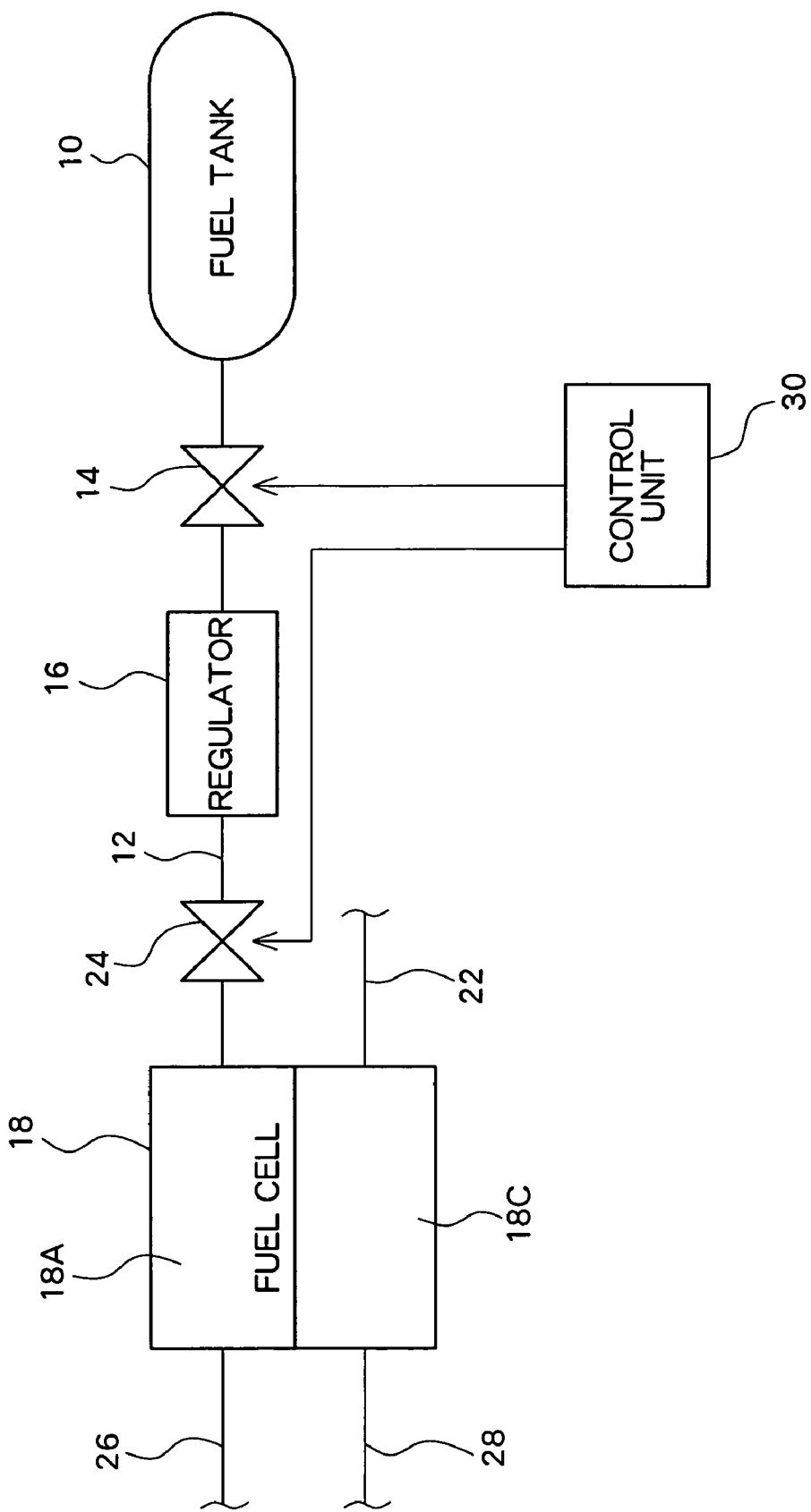
FIG. 1 is a schematic diagram of the configuration of a fuel cell system according to an embodiment of the present invention.

Preferred embodiments of the present invention will now be described with reference to the drawings. FIG. 1 is a schematic diagram of the configuration of a fuel cell system according to an embodiment of the present invention. The fuel cell configuration is roughly divided into a fuel-cell 18, a fuel gas supply device for supplying fuel gas to the fuel cell 18, and a control unit 30. The configuration of the fuel cell gas supply device is roughly divided into a fuel gas supply source for storing fuel gas and a valve system for controlling fuel gas supply from the fuel gas supply source to the fuel cell 18. The valve system is provided with openable/closable shut valves 14, 24.

A fuel tank 10 provided as a fuel gas supply source stores fuel gas on the inside. Hydrogen ($H_2$) may be used as the fuel gas here. An outlet of the fuel tank 10 is connected to a fuel gas supply path 12 for connecting the fuel tank 10 and an anode side 18A of the fuel cell 18.

The fuel gas supply path 12 has, from the fuel tank 10 side to the fuel cell 18 side, in order, a shut valve (first shut valve) 14, a regulator (pressure-reducing valve), and a shut valve (second shut valve) 24. That is, the shut valve 24 is provided more to the downstream side of the fuel gas flow than the shut valve 14, and the regulator 16 is provided between the shut valve 14 and the shut valve 24. Further, the shut valve 14 may be provided at the outlet portion of the fuel tank 10.

When both of the shut valves 14, 24 are open, fuel gas flow in the fuel gas supply path 12, that is, the fuel gas flow from the fuel tank 10 to the fuel cell 18, is permitted. At this time, fuel gas is supplied to the regulator 16 from the fuel tank 10 via the shut valve 14. The regulator 16 reduces pressure of the supplied fuel gas and outputs it to an anode side 18A of the fuel cell 18 via the shut valve 24. Oxidation gas is supplied to the cathode side 18C of the fuel cell 18 via an oxidation gas supply path 22. Here, oxidation gas may be air, for example.

On the other hand, when the shut valve 14 is closed, fuel gas flow in the fuel gas supply path 12 from the fuel tank 10 to the fuel cell 18 is shutoff by the shut valve 14. Also, when the shut valve 24 is closed, fuel gas flow in the fuel gas supply path 12 is shutoff by the shut valve 24. In the present embodiment, two shut valves 14, 24 are provided to improve the sealability of fuel gas when the shut valves 14, 24 are closed. Further, opening/closing operation of the shut valves 14, 24 may be controlled by control signals output by a control unit 30.

At the fuel cell 18, fuel gas (hydrogen gas) supplied to an anode side 18A is dissociated into protons (H+) and electrons (e−) by catalysis of the anode. Dissociated protons move through the electrolyte membrane while the electrons move to the cathode through an external load, where the electrons react with oxygen-contained in the oxidation gas (air) supplied to a cathode side 18C through catalysis of the cathode to generate water. Electrical energy is generated by this electrochemical reaction using fuel gas and oxidation gas. Waste fuel gas after being used for the electrochemical reaction is emitted from the anode side 18A to a waste fuel gas path 26, while the waste oxidation gas after being used for the electrochemical reaction is emitted from the cathode side 18C to the waste oxidation gas path 28.

Figure 2A:
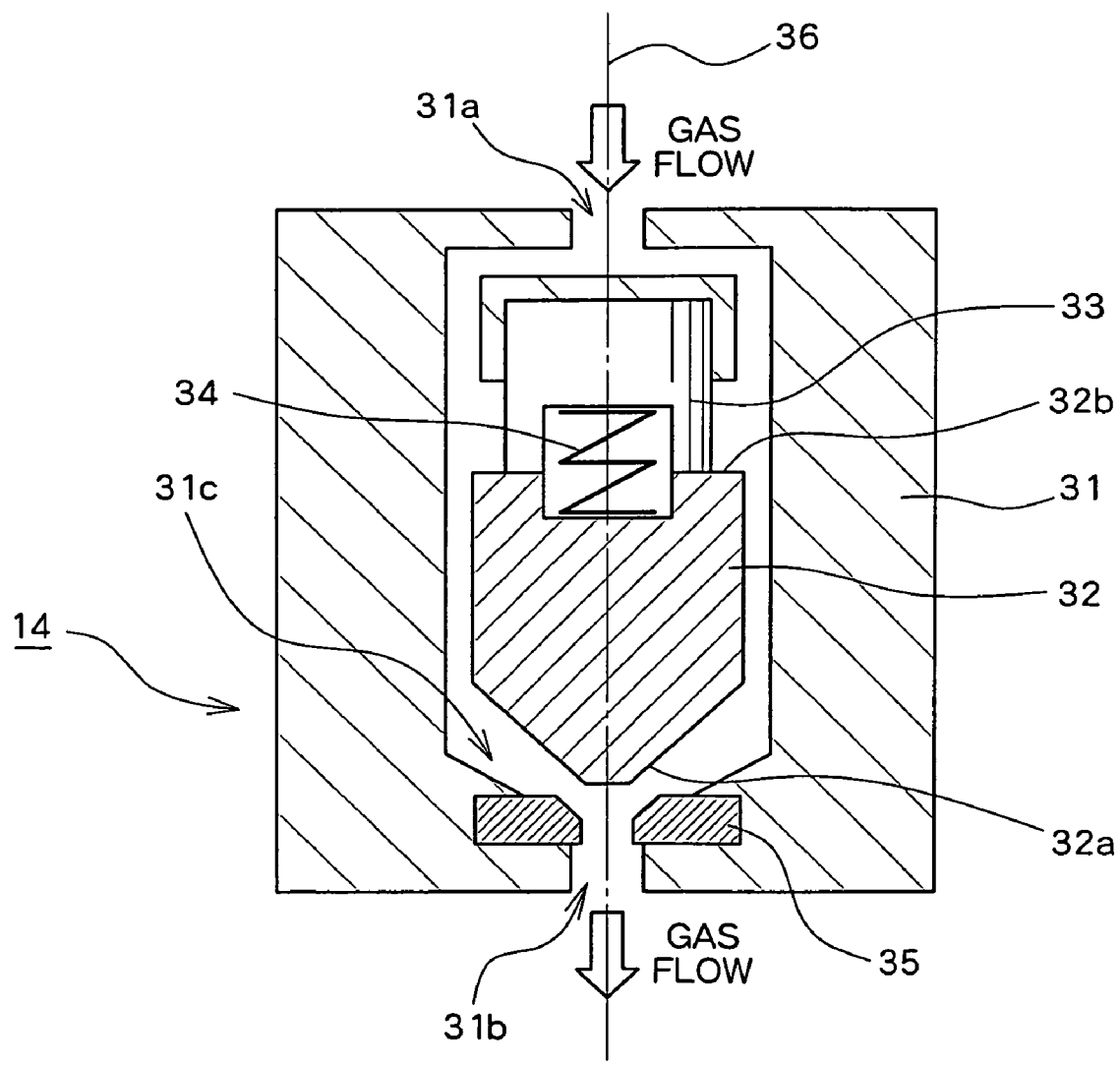
FIG. 2A is a drawing showing an example of configuration of a shut valve.
Figure 2B:
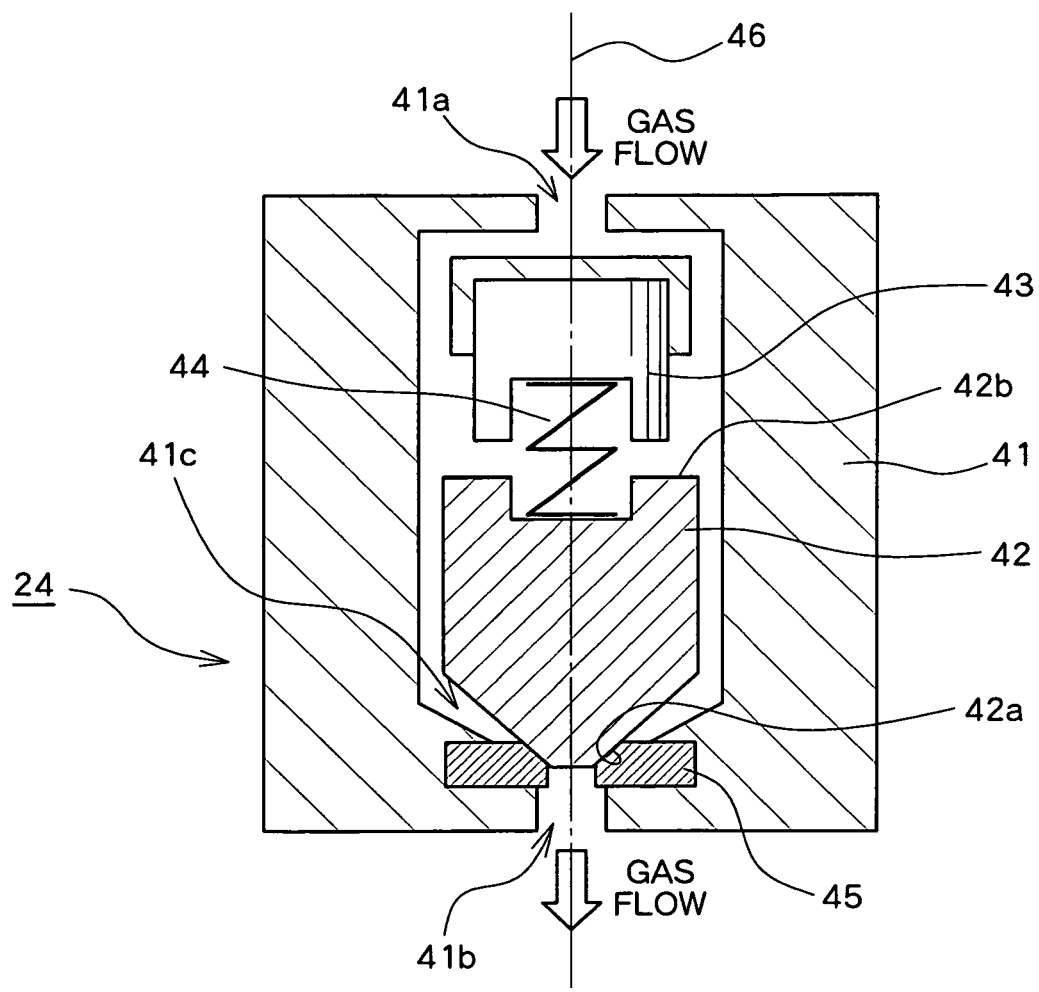
FIG. 2B is a drawing showing an example of configuration of a shut valve.

Examples of configuration of shut valves 14, 24 here are shown in FIGS. 2A, 2B. FIG. 2A shows a state where the shut valve 14 is open and FIG. 2A shows a state where the shut valve 24 is closed.

The shut valve 14 has, as shown in FIG. 2A, a valve housing 31, a movable member 32, an electromagnetic coil 33, a spring 34, and a seal member (first seal member) 35. An upstream side port 31a communicating with the fuel tank 10 and a downstream side port 31b communicating with the regulator 16 are formed in the valve housing 31. Further, a seat portion 31c for allowing an intimate contact with the movable member 32 is formed in the valve housing 31, and an annular seal member 35 is provided at the seat portion 31c.

The movable member 32 moves inside the valve housing 31 in the direction parallel to a central axis 36 thereof (hereafter referred to as the central axis direction) to open and close the communication between the upstream side port 31a and the downstream side port 31b. When the electromagnetic coil 33 is not generating an electromagnetic force, the movable member 32 is urged to one side of the central axis direction (the bottom side in FIG. 2A) due to a restoring force of the spring 34 such that an intimate contact portion (first intimate contact portion) 32a provided on the movable member 32 is brought into intimate contact with the seal member 35 (seat portion 31c). The communication between the upstream side port 31a and the downstream side port 31b, that is, the fuel gas flow in the fuel gas supply path 12 is shutoff by the intimate contact of the intimate contact portion 32a and the seal member 35. That is, the shut valve 14 is closed in this case. Further, the movable member 32 receives a fuel gas pressure supplied from the upstream side port 31a, which is located on the upstream side of the fuel gas flow, on one side thereof in the central axis direction, on a pressure-receiving surface 32b thereof. That is, the movable member 32 is also urged to one side (seal member 35 side) in the central axis direction by the fuel gas pressure supplied from the upstream side port 31a. In this manner, a force in the direction of shutting off the fuel gas flow in the fuel gas supply path 12 acts on the movable member 32 due to the restoring force of the spring 34 and the pressure of fuel gas supplied from the upstream side port 31a.

On the other hand, when the electromagnetic coil 33 is generating the electromagnetic force, the movable member 32 is attracted to the other side in the central axis direction (upper side in FIG. 2A) by the electromagnetic force, such that the intimate contact portion 32a of the movable member 32 is separated from the seal member 35 (seat portion 31c). In this case, the upstream side port 31a and the downstream side port 31b are in communication. That is, the shut valve 14 is open. Further, the electromagnetic force of the electromagnetic coil 33 may be controlled by the control signal output by the control unit 30.

As shown in FIG. 2B, the shut valve 24 has, similarly to the shut valve 14, a valve housing 41, a movable member 42, an electromagnetic coil 43, a spring 44, and a seal member (second seal member) 45. An upstream side port 41a communicating with the regulator 16 and a downstream side port 41b communicating with the fuel cell 18 are formed in the valve housing 41. Further, a seat portion 41c for allowing intimate contact with the movable member 42 is formed in the valve housing 41, and an annular seal member 45 is provided at the seat portion 41c.

The movable member 42 moves inside the valve housing 41 in the direction parallel to a central axis 46 thereof (the central axis direction), to open and close the communication between the upstream side port 41a and the downstream side port 41b. When the electromagnetic coil 43 is not generating an electromagnetic force, the movable member 42 is urged to one side of the central axis direction (the bottom side in FIG. 2B) due to a restoring force of the spring 44 such that an intimate contact portion (second intimate contact portion) 42a provided on the movable member 42 is brought into intimate contact with the seal member 45 (seat portion 41c). Further, the movable member 42 receives a fuel gas-pressure supplied from the upstream side port 41a which is located on the upstream side of the fuel gas flow on one side thereof in the central axis direction (on the seal member 45 side), on a pressure-receiving surface 42b thereof. Accordingly, the intimate contact portion 42a of the movable member 42 is brought also into intimate contact with the seal member 45 by the fuel gas pressure supplied from the upstream side port 41a. In this case, the shut valve 24 is closed, and the fuel gas flow in the fuel gas supply path 12 is shutoff. In this manner, a force in the direction of shutting off the fuel gas flow in the fuel gas supply path 12 acts on the movable member 42 due to the restoring force of the spring 44 and the pressure of fuel gas supplied from the upstream side port 41a. On the other hand, when the electromagnetic coil 43 is generating electromagnetic force, the movable member 42 is attracted to the other side in the central axis direction (upper side in FIG. 2B) by the electromagnetic force, such that the intimate contact portion 42a of the movable member 42 is separated from the seal member 45 (seat portion 41c). In this case, the shut valve 24 is open. Further, the electromagnetic force of the electromagnetic coil 43 may be controlled by control signals output by the control unit 30.

When generating electricity by the fuel cell 18, the control unit 30 outputs control signals to the shut valves 14, 24 so as to generate electromagnetic force in the electromagnetic coils 33, 43 to open shut valves 14, 24. When the shut valves 14, 24 are open, pressure of fuel gas stored inside the fuel tank 10 at high pressure (approximately 35 MPa, for example) is decreased down to a set pressure (approximately 0.2 MPa, for example) by the regulator 16 to be supplied to the anode side 18A of the fuel cell 18. The fuel cell 18 generates electrical energy by an electrochemical reaction using fuel gas supplied to the anode side 18A and the oxidation gas supplied to the cathode side 18C.

On the other hand, when stopping electrical generation by the fuel cell 18, the control unit 30 stops output of control signals to the shut valves 14, 24 such that generation of electromagnetic force by the electromagnetic coils 33, 43 is stopped by closing the shut valves 14, 24. Here, the shut valves 14, 24 may be closed simultaneously, or the shut valve 24 may be closed after lapse of a predetermined time after closing of the shut valve 14. When the shut valves 14, 24 are closed, fuel gas flow in the fuel gas supply path 12 is shutoff, and the supply of fuel gas from the fuel tank 10 to the fuel cell 18 is stopped. As a result, generation of electrical energy from the fuel cell is stopped. According to the present embodiment, two shut valves 14, 20 are closed to stop the electric generation by the fuel cell 18 such that the sealability of fuel gas is improved.

In the shut valve 14, sealing is performed by close contact of the intimate contact portion 32a of the movable member 32 and the seal member 35, as a result of the restoring force of the spring 34 and the pressure of the fuel gas from the upstream side port 31a generate a force that forces to closely contact the intimate contact portion 32a of the movable member 32 to the seal member 35. Similarly, in the shut valve 24, sealing is performed by close contact of the intimate contact portion 42a of the movable member 42 and the seal member 45, as a result of the restoring force of the spring 44 and the pressure of the fuel gas from the upstream side port 41a generate a force that forces to closely contact the intimate contact portion 42a of the movable member 42 to the seal member 45. The fuel gas pressure at the upstream side port 41a of the shut valve 24 is lower than the fuel gas pressure at the upstream side port 31a of the shut valve 14, such that the force for bringing the intimate contact portion 42a of the movable member 42 into intimate contact with the seal member 45 of the shut valve 24 is smaller than the force for bringing the intimate contact portion 32a of the movable member 32 into intimate contact with the seal member 35 of the shut valve 14.

Hence, the close contact force between the intimate contact portion 32a of the movable member 32 and the seal member 35 is greater than that of the shut valve 24, so that when soft material such as rubber is used as the material for making up the seal member 35, the seal member 35 tends to result in plastic deformation and thus durability of the seal member 35 tends to deteriorate. Regarding performance of the seal member 35, it is necessary that the seal member 35 is difficult to plastically deform even under the application of a large external force. On the other hand, since the close contact force between the intimate contact portion 42a of the movable member 42 and the seal member 45 is smaller than that of the shut valve 14, when hard material such as resin is used as the material for making up the seal member 45, the close contact between the intimate contact portion 42a of the movable member 42 and the seal member 45 tends to become insufficient and the sealability tends to deteriorate. Regarding performance of the seal member 45, it is necessary that the seal member 45 is able to ensure sealability even under a small external force. Thus, in the present embodiment, sealing performances required from the respective shut valves 14, 24 are different.

Figure 3:
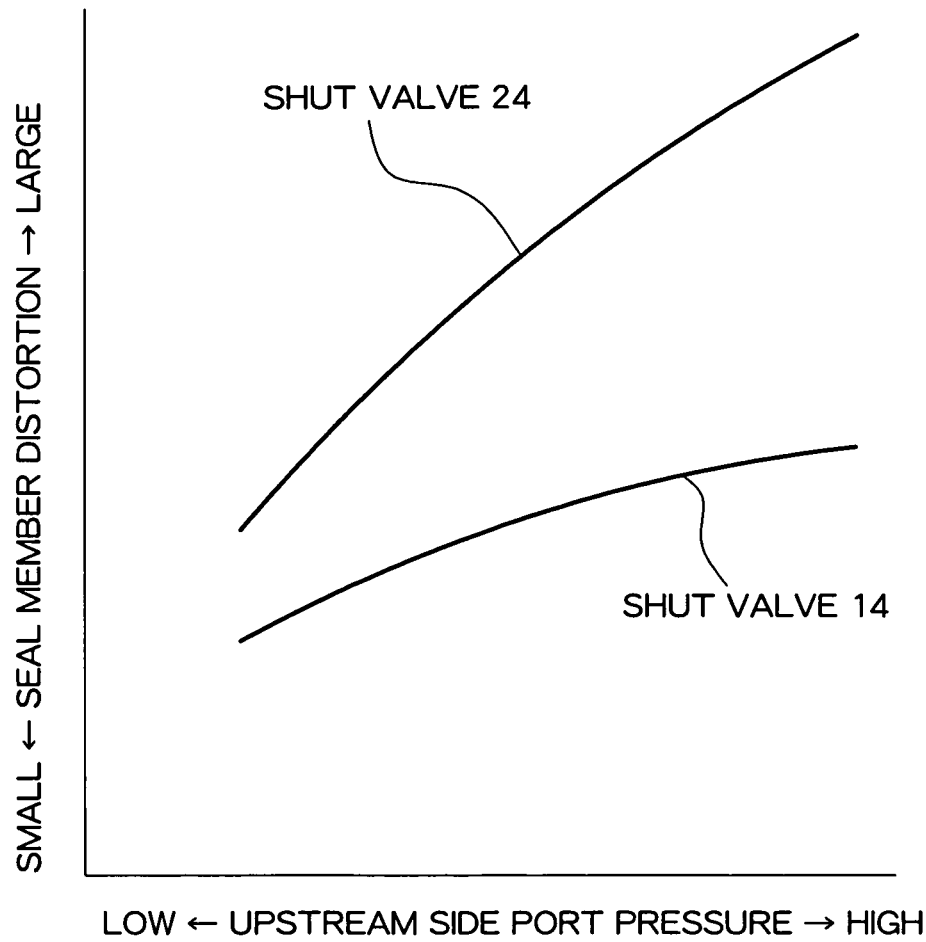
FIG. 3 is a drawing showing an example of sealability characteristic of a shut valve.

Therefore, in the present embodiment, the seal member 35 is made of a hard material that is difficult to plastically deform, and the seal member 45 is made of a soft material that is easy to plastically deform. For example, the seal member 35 is made of resin and the seal member 45 is made of rubber softer than resin. Accordingly, degree of elastic deformation (distortion) of seal members 35, 45 by an external force of the same intensity will be different, and the degree of elastic deformation (distortion) of the seal member 45 becomes greater than that of the seal member 35 under an external force of the same intensity. That is, elastic modulus of the seal member 45 is set lower than that of the seal member 35, such that the seal member 45 tends to more easily result in elastic deformation than the seal member 35 under an external force of the same intensity. Thus, in the present embodiment, physical properties of the seal member 45 are made different from those of the seal member 35. As a result, as shown in FIG. 3, distortion characteristic of the seal member 45 under fuel gas pressure from the upstream side port 41*a* when the shut valve 24 is closed (sealability characteristic of the shut valve 24) is different from the distortion characteristic of the seal member 35 under fuel gas pressure from the upstream side port 31*a* when the shut valve 14 is closed (sealability characteristic of the shut valve 14).

In the state where the shut valve 14 is closed, the supply pressure of fuel gas from the upstream side port 31*a* is high and the close contact force between the intimate contact portion 32*a* of the movable member 32 and the seal member 35 becomes high. However, degree of deformation (distortion) of the seal member 35 is restrained by the elastic modulus of the seal member 35 being set to a large value. Accordingly, durability of the seal member 35 is ensured even under application of a large external force on the seal member 35.

On the other hand, in the state where the shut valve 24 is closed, the supply pressure of fuel gas from the upstream side port 41*a* is low and the close contact force between the intimate contact portion 42*a* of the movable member 42 and the seal member 45 becomes low. However, degree of deformation (distortion) of the seal member 45 necessary for sealing can be ensured by the elastic modulus of the seal member 45 being set to a small value. Accordingly, sealability may be sufficiently ensured even with application of a small external force on the seal member 45.

In this way, in the present embodiment, by making the sealability characteristic (deformation characteristic of the seal member 45) against fuel gas pressure from the upstream side port 41*a* of the shut valve 24 different from the sealability characteristic (deformation characteristic of the seal member 35) against fuel gas pressure from the upstream side port 31*a* of the shut valve 14, sealability characteristics of the respective shut valves 14, 24 may become adaptable to the performance required at each location of disposition. According to the present embodiment, since it is not necessary to design shut valves 14, 24 such that they satisfy the sealability required at all locations of disposition, the overall valve system configuration may be simplified at the same time as realizing desired sealability of fuel gas. Further, in JP 2005-201822 A, JP 2005-11703 A, JP 2004-170321 A, and JP 8-329965, nothing is disclosed in relation to making the shut valve performance different depending on where the shut valves are disposed.

When minor leakage occurs from the shut valve 14 in the state where the shut valves 14, 24 are closed, pressure in the fuel gas supply path between the shut valves 14, 24 increases. In the present embodiment, the seal member 45 may be composed of a material (rubber) having a predetermined gas permeability, whereby the pressure increase between shut valves 14, 24 can be restrained. Also, the gas permeability of the seal member 45 may be set to a desired gas permeability (permeability coefficient) by setting of the material for the seal member 45. For example, butyl rubber may be used as the material for the seal member 45, as a material having a small gas permeability coefficient. Alternatively, as a material having a larger gas permeability coefficient (rubber) than butyl rubber, silicone rubber may be used as the material for the seal member 45.

Figure 4A:
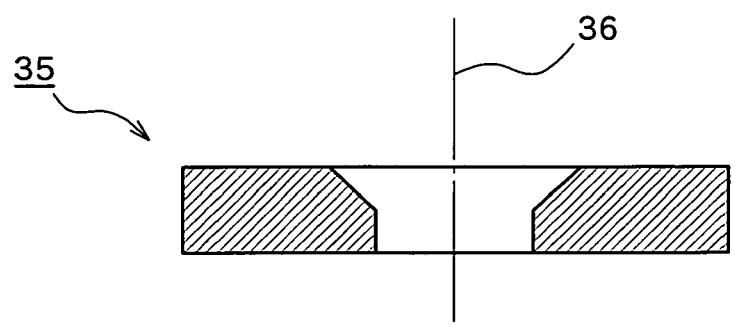
FIG. 4A is a drawing showing an example of configuration of a seal member.
Figure 4B:
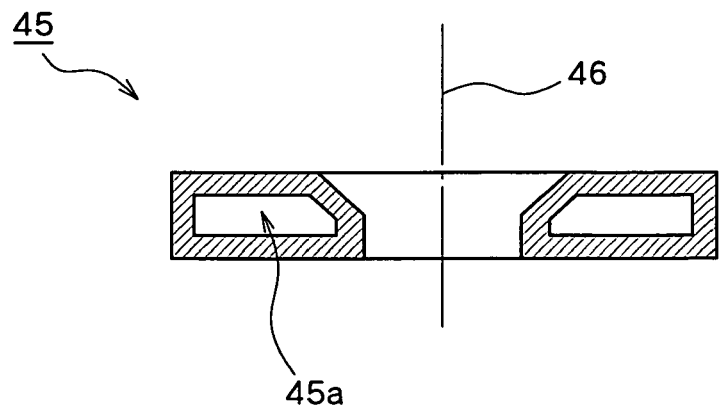
FIG. 4B is a drawing showing an example of configuration of a seal member.

According to the above-mentioned description of the present embodiment, the materials for making up the seal members 35, 45 are made different from each other so as to make the sealability characteristics of shut valves 14, 24 different. However, in the present embodiment, sealability characteristics of shut valves 14, 24 may be made different from each other by making the sectional shapes of the seal members 35, 45 different. For example, as shown in FIG. 4A, the annular portion of the seal member 35 is made into a solid shape, whereas the sectional shape of the annular portion of the seal member 45 is made into a hollow shape with a hollow portion 45*a*, as shown in FIG. 4B. By constructing the seal members 35, 45 in this way, the degree of elastic deformation (distortion) of the seal member 45 becomes greater than that of the seal member 35 under an external force of the same intensity (elastic modulus of the seal member 45 is set lower than that of the seal member 35). FIGS. 4A and 4B show sectional shapes taken at a plane including the central axis 36 (46).

In the present embodiment, urging force of the spring 44 in the state where the shut valve 24 is closed may be made different from that of the spring 34 where the shut valve 14 is closed so as to make the sealability characteristics of the shut valves 14, 24 different. For example, the urging force of the spring 44 in the state where the shut valve 24 is closed is set to a larger value than that of the spring 34 in the state where the shut valve 14 is closed. This configuration also allows restraint of the deformation degree (distortion) of the seal member 35 in the state where the shut valve 14 is closed, as well as increasing the deformation degree (distortion) of the seal member 45 in the state where the shut valve 24 is closed. Accordingly, it makes it possible to ensure durability of the seal member 35 while ensuring the deformation degree of the seal member 45 necessary for sealing.

Further, in the present embodiment, the area of the pressure receiving surface 42*b* of the movable member 42 may be different from that of the pressure receiving surface 32*b* of the movable member 32 so as to make sealability characteristics of the shut valves 14, 24 different from each other. For example, the area of the pressure receiving surface 42*b* is set to be larger than the area of the pressure receiving surface 32*b*. By adopting such a configuration, deformation degree (distortion) of the seal member 35 in the state where the shut valve 14 is closed may be restrained, and at the same time, deformation degree (distortion) of the seal member 45 in the state where the shut valve 24 is closed may be increased. Also, in the present embodiment, the force (force for shutting off the fuel gas in the fuel gas supply path 12) for causing close contact of the intimate contact portion 32*a* of the movable member 32 against the seal member 35 in the shut valve 14 may be generated solely by the restoring force of the spring 34 without using the pressure of fuel gas from the upstream side port 31*a*. This configuration also allows controlling of the deformation degree (distortion) of the seal member 35 in the state where the shut valve 14 is closed.

Figure 5:
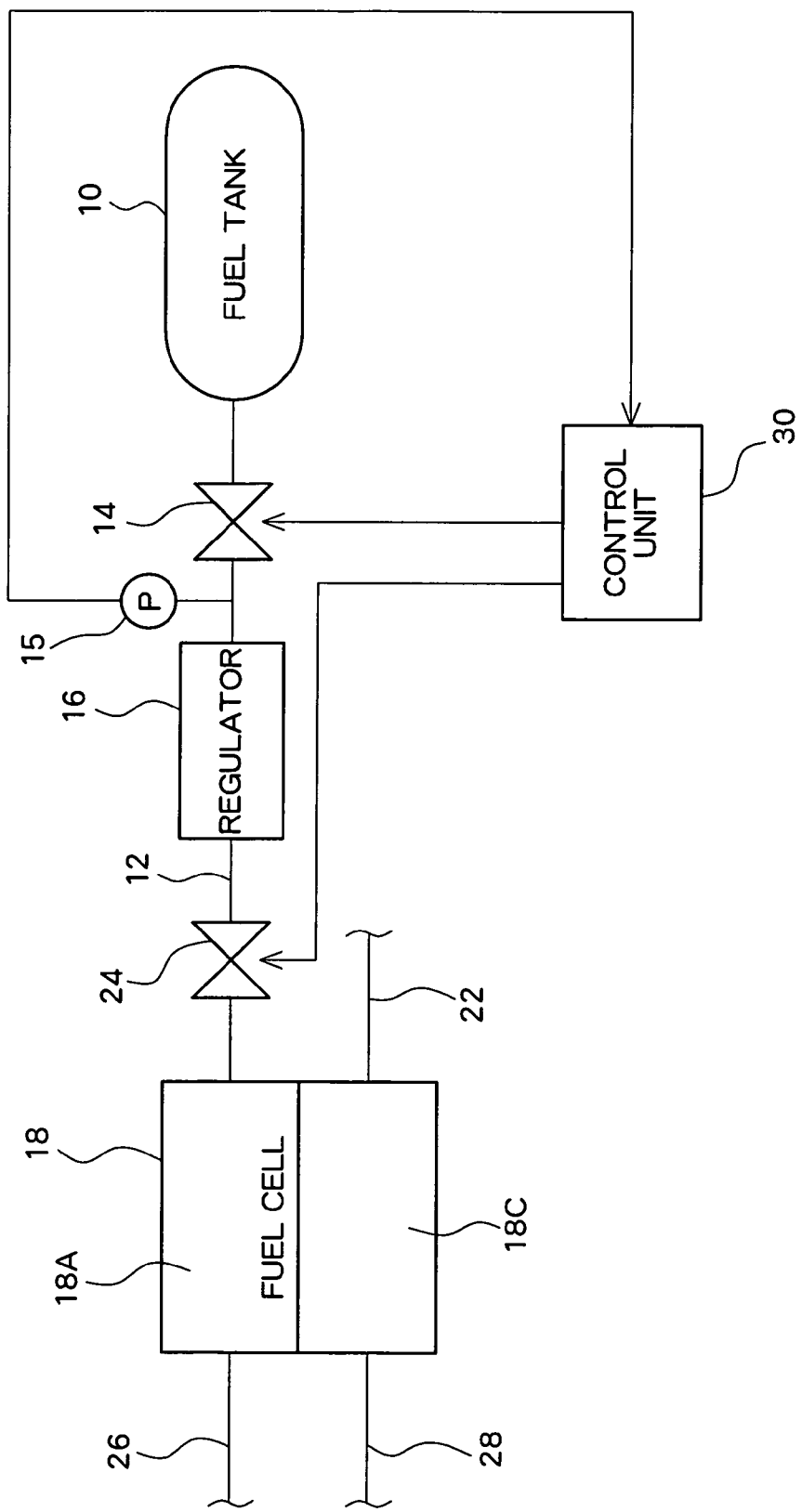
FIG. 5 is a schematic diagram of another configuration a fuel cell system according to an embodiment of the present invention.
Figure 6:
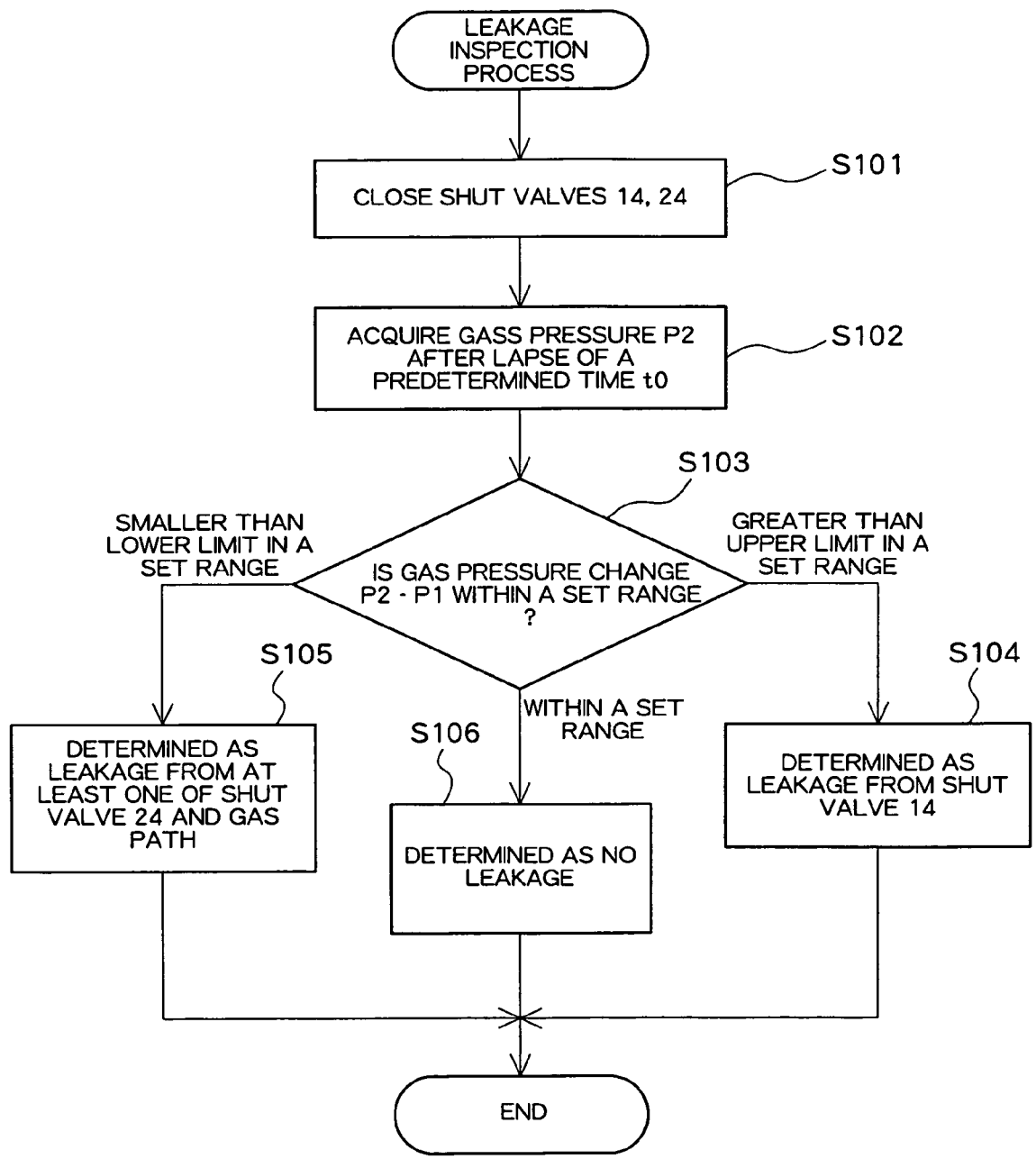
FIG. 6 is a flowchart explaining the process of implementing fuel gas leakage inspection by a control unit.

Further, in the fuel cell system according to the present embodiment, fuel gas leakage inspection may also be implemented. As shown in FIG. 5, in the fuel cell system capable of implementing fuel gas leakage inspection, a pressure sensor 15 for detecting gas pressure is located between shut valves 14 and 24 in the fuel gas supply path 12 (hereafter referred to as the inspection range), more particularly between the shut valve 14 and the regulator 16. Gas pressure P in the inspection range detected by the pressure sensor 15 is input to the control unit 30. Hereafter, a process for implementing fuel gas leakage inspection by the control unit 30 will be explained with reference to a flowchart in FIG. 6.

When implementing fuel gas leakage inspection, the control unit 30 stops the output of control signals to shut valves 14, 24 to close the shut valves 14, 24 (Step S101). Here, first the shut valve 14 is closed, then the gas pressure P detected by the pressure sensor 15 is decreased to a set pressure P1, and the shut valve 24 is closed. Next, the control unit 30 acquires a gas pressure P2 in the inspection range from the pressure sensor 15 after lapse of a predetermined time t0 from shutting of the shut valve 24 (Step S102). Next, the control unit 30 determines whether the gas pressure change P2-P1 in the inspection range at the predetermined time t0 is within a set range (Step S103). If the gas pressure change P2-P1 in the inspection range is greater than an upper limit Pmax of the set range (upper limit is a positive value), the control unit 30 determines that leakage is occurring from the shut valve 14 (Step S104). Further, if the gas pressure change P2-P1 in the inspection range is greater than a lower limit value −Pmin (lower limit is a negative value), the control unit 30 determines that leakage is occurring from at least one of the shut valve 24 and the gas path in the inspection range (Step S105). On the other hand, if the gas pressure change P2-P1 in the inspection range is within the set range, the control unit 30 determines that leakage is not generated from shut valves 14, 24 and the gas path in the inspection range (Step S106). Accordingly, in the present embodiment, the control unit 30 is capable of determining gas leakage based on the pressure change between the shut valves 14 and 24 (inspection range) when the shut valves 14, 24 are controlled to be closed. Further, it may be possible to implement gas leakage determination by repeatedly executing the process of flowchart shown in FIG. 6 while changing the aforementioned set pressure P1.

While embodiments for implementing the present invention have been described, the present invention is by no means limited to these embodiments, and it goes without saying that the present invention may be implemented in various forms without departing from the scope of the invention.

The invention claimed is:

1. A fuel cell system, comprising:
a fuel cell;
a first shut valve capable of shutting off a gas flow in a gas path where a fuel cell gas flows; and
a second shut valve arranged more towards the downstream side of the gas flow than the first shut valve and capable of shutting off the gas flow, wherein
the first shut valve is capable of shutting off the gas flow by intimate contact between a first intimate contact portion provided at the first shut valve and a first seal member,
the second shut valve is capable of shutting off the gas flow by intimate contact between a second intimate contact portion provided at the second shut valve and a second seal member, and
the second seal member has a hollow body and has a greater degree of deformation by an external force of the same intensity than the first seal member.

2. The fuel cell system according to claim 1, wherein materials for constituting the first seal member and the second seal member are different from each other.

3. The fuel cell system according to claim 2, wherein the first seal member is made of resin and the second seal member is made of rubber.

4. The fuel cell system according to claim 1, wherein body structures of the first seal member and the second seal member are different from each other.

5. The fuel cell system according to claim 4, wherein the body of the first seal member is solid and has no cavity.

6. The fuel cell system according to claim 1, wherein the second seal member possesses a predetermined gas permeation characteristic.

7. The fuel cell system according to claim 1, wherein
a pressure-reducing device for reducing pressure of the supplied gas and outputting the pressure-reduced gas is provided in the gas path between the first shut valve and the second shut valve.

8. The fuel cell system according to claim 1, wherein
at least one of the first shut valve and the second shut valve is such that a force in the direction of shutting off the gas flow acts thereon due to pressure of gas supplied from the upstream side of the gas flow.

9. A fuel cell valve system, comprising:
a first shut valve capable of shutting off a gas flow in a gas path where a fuel cell gas flows; and
a second shut valve arranged more towards the downstream side of the gas flow than the first shut valve and capable of shutting off the gas flow, wherein
the first shut valve is capable of shutting off the gas flow by intimate contact between a first intimate contact portion provided at the first shut valve and a first seal member,
the second shut valve is capable of shutting off the gas flow by intimate contact between a second intimate contact portion provided at the second shut valve and a second seal member, and
the second seal member has a hollow body and has a greater degree of deformation by an external force of the same intensity than the first seal member.

10. A fuel gas supply device capable of supplying a fuel gas from a fuel gas supply source via a gas path, comprising:
a first shut valve capable of shutting off a fuel gas flow in the gas path; and
a second shut valve arranged more towards the downstream side of the fuel gas flow than the first shut valve and capable of shutting off the fuel gas flow, wherein
the first shut valve is capable of shutting off the fuel gas flow by intimate contact between a first intimate contact portion provided at the first shut valve and a first seal member,
the second shut valve is capable of shutting off the fuel gas flow by intimate contact between a second intimate contact portion provided at the second shut valve and a second seal member, and
the second seal member has a hollow body and has a greater degree of deformation by an external force of the same intensity than the first seal member.

* * * * *